US009584175B2

(12) United States Patent
Waheed et al.

(10) Patent No.: US 9,584,175 B2
(45) Date of Patent: Feb. 28, 2017

(54) RADIO FREQUENCY TRANSCEIVER LOOPBACK TESTING

(71) Applicant: FREESCALE SEMICONDUCTOR, INC., Austin, TX (US)

(72) Inventors: Khurram Waheed, Austin, TX (US); Chris N. Stoll, Dripping Springs, TX (US); Jayson D. Vogler, Austin, TX (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 14/572,295

(22) Filed: Dec. 16, 2014

(65) Prior Publication Data

US 2016/0174094 A1 Jun. 16, 2016

(51) Int. Cl.
*H04W 24/00* (2009.01)
*H04B 1/40* (2015.01)
*H04W 24/10* (2009.01)

(52) U.S. Cl.
CPC .............. *H04B 1/40* (2013.01); *H04W 24/10* (2013.01)

(58) Field of Classification Search
CPC ................................. H04W 24/10; H04B 1/40
USPC ......................................................... 455/423
See application file for complete search history.

(56) References Cited

U.S. PATENT DOCUMENTS

| | | | |
|---|---|---|---|
| 5,481,186 A | 1/1996 | Heutmaker et al. | |
| 6,208,216 B1 * | 3/2001 | Nasila | 332/110 |
| 7,111,208 B2 | 9/2006 | Hoang et al. | |
| 7,613,125 B2 | 11/2009 | Fidler et al. | |
| 7,715,836 B2 * | 5/2010 | Vassiliou | H04B 17/14 455/115.1 |
| 7,856,048 B1 * | 12/2010 | Smaini | H04B 1/40 330/2 |
| 8,284,824 B1 | 10/2012 | Smaini et al. | |
| 8,559,488 B1 | 10/2013 | Wang et al. | |
| 8,619,599 B1 | 12/2013 | Even | |
| 9,077,328 B1 * | 7/2015 | Valliappan | H04L 7/033 |
| 2004/0240485 A1 * | 12/2004 | Lipski et al. | 370/537 |
| 2007/0190958 A1 * | 8/2007 | Darabi | 455/285 |
| 2008/0068236 A1 * | 3/2008 | Sheba et al. | 341/118 |
| 2008/0212607 A1 * | 9/2008 | Batty | G06F 13/4072 370/464 |
| 2009/0156149 A1 * | 6/2009 | Plevridis et al. | 455/260 |
| 2010/0177811 A1 | 7/2010 | Duerdodt et al. | |
| 2013/0272175 A1 | 10/2013 | Abdollahi-Alibeik et al. | |
| 2014/0091842 A1 * | 4/2014 | Mehio et al. | 327/147 |

\* cited by examiner

*Primary Examiner* — Nader Bolourchi

(57) ABSTRACT

An integrated circuit includes a receiver portion, a transmitter portion, and a modulated phase locked loop. The receiver portion is for receiving a radio frequency (RF) signal at a receiver input of the receiver portion. The transmitter portion is for transmitting an RF signal at a transmitter output of the transmitter portion. The modulated phase locked loop (PLL) is shared between the receiver portion and the transmitter portion. The transmitter output and receiver input are coupled together in a loopback configuration during a test mode. The transmitter portion and the receiver portion are enabled concurrently while a modulated PLL signal is provided to the receiver portion from the transmitter portion via the loopback configuration.

20 Claims, 5 Drawing Sheets

US 9,584,175 B2

RADIO FREQUENCY TRANSCEIVER LOOPBACK TESTING

BACKGROUND

Field

This disclosure relates generally to transceiver testing, and more specifically, to loopback testing for a transceiver.

Related Art

There is increasing demand for a low cost radio frequency (RF) transceiver integrated in a system-on-a-chip (SoC) with an embedded controller or processor and other peripherals for use in smart home, life, sensors, etc. in a market segment sometimes referred to as the internet of things (IOTs). A constant envelope RF transceiver is commonly used for low cost low data rate applications and uses a single phase locked loop (PLL) for both the receive and transmit operations. During production, the RF functionality of such transceivers requires the use of expensive test equipment, which is not only costly but also inhibits parallel testing of multiple die. Also, with respect to a constant envelope RF transceiver having only a single PLL, testing of production transmit and receive functionality has to be conducted serially, reducing throughput and increasing test cost. Low cost testing of a processor or MCU is achieved by testing several die in parallel. However, if the MCU is integrated with an RF transceiver, this would be possible only if the transceiver allows for such an arrangement. Otherwise, the MCU and the transceiver portions would need to be either tested serially or the test speed of the SoC would be throttled by the slow testing of the RF transceiver. Therefore, a need exists for faster testing of a device having an integrated RF transceiver.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
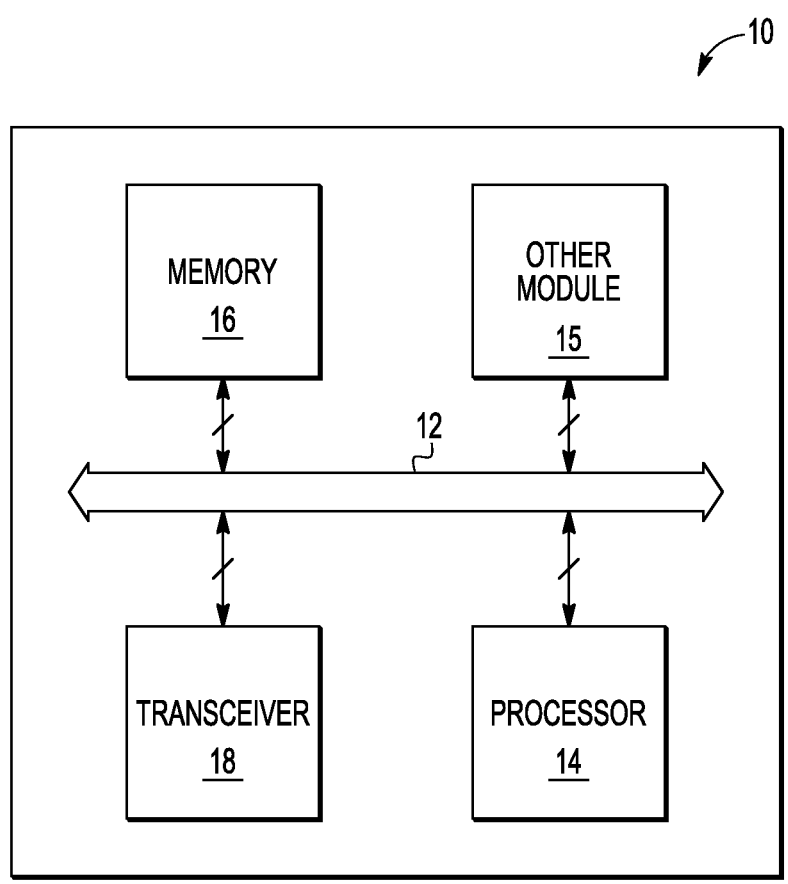
FIG. 1 illustrates, in block diagram form, an integrated circuit in accordance with an embodiment.

Generally, there is provided, an integrated circuit having a constant envelope transceiver and a method for testing the transceiver. The transceiver may be implemented on an integrated circuit with a processor. The transceiver includes a shared phase locked loop (PLL) for time-division receive and transmit operations. To test the transceiver, a signal from the PLL is modulated. The transmitter and the receiver are enabled simultaneously for loopback operation so that the modulated PLL signal is provided from the transmitter to an input of the receiver. The received signal is then analyzed in either the time domain or the frequency domain to determine specific functionality of the transceiver. The received signal can be analyzed on-chip as with a built-in-self-test (BIST) or off-chip with a tester or analyzer.

Testing a constant envelope transceiver in this manner does not require the use of expensive test equipment. Also, testing of multiple integrated circuits can be carried out in parallel reducing test time and testing cost. Depending on the transmitter modulation used, the received signal can be analyzed using, for example, a fast Fourier Transform (FFT) spectral analysis to find distortions introduced by the loopback path.

In one embodiment, there is provided, an integrated circuit comprising: a receiver portion for receiving a radio frequency (RF) signal at a receiver input of the receiver portion; a transmitter portion for transmitting an RF signal at a transmitter output of the transmitter portion; a modulated phase locked loop (PLL) shared between the receiver portion and the transmitter portion; and wherein the transmitter output and receiver input are coupled together in a loopback configuration during a test mode. The integrated circuit may further comprise a common RF port whereby the transmitter output and the receiver input are coupled in the loopback configuration during the test mode. The transmitter portion and the receiver portion may be simultaneously operable. The modulated PLL may be configured to provide a predetermined constant envelope modulation to the transmitter portion and to the receiver portion. The integrated circuit may further comprise a memory for storing at least a portion of a digitized baseband signal representative of the RF signal received at the receiver input. The integrated circuit may further comprise an analyzer coupled to the memory via a bus for determining whether the stored portion of the digitized baseband signal is within a predetermined limit. The analyzer may be a spectrum analyzer. The analyzer may be a processor capable of computing an error metric of the stored portion of the digitized baseband signal.

In another embodiment, there is provided a method of testing an integrated circuit comprising: coupling a receiver portion of a radio frequency (RF) transceiver at a receiver input to a transmitter portion of the transceiver at a transmitter output in a loopback configuration during a test mode; providing a phase locked loop (PLL) output signal to the transmitter portion and to the receiver portion; modulating the PLL output signal based on a transmitter modulation signal received at the PLL during the test mode; and receiving at the receiver input a signal output from the transmitter portion. The transmitter portion and the receiver portion may be operated concurrently during the test mode. The step of modulating the PLL output signal may provide a predetermined constant envelope modulation signal to the transmitter portion and to the receiver portion. The predetermined constant envelope modulation may be characterized as a tone modulation. The method may further comprise outputting an in-phase receiver signal at a first output of the receiver portion and a quadrature receiver signal at a second output of the receiver portion wherein each of the in-phase receiver signal and the quadrature receiver signal has a frequency that is twice the frequency of the corresponding signal output from the transmitter portion. The method may further comprise coupling a signal processor to the first output and to the second output of the receiver portion for generating a digital baseband signal representative of the RF signal received at the receiver input. The method may further comprise storing in a memory at least a portion of the digitized baseband signal representative of the RF signal received at the receiver input. The method may further comprise analyzing data stored in the memory for distortions introduced in loopback configuration. The analyzing data stored in the memory may include computing a spectral metric of the loopback signal quality of the transceiver. The method may further comprise testing a module concurrently while testing the transceiver.

In yet another embodiment, there is provided a method of testing a radio frequency (RF) transceiver comprising: providing a RF transceiver having a receiver portion input coupled to a transmitter portion output in a loopback configuration; and performing a loopback test during which a shared modulated phase locked loop (PLL) output is coupled to the receiver portion and to the transmitter portion. The method may further comprise: receiving at the receiver portion input a signal from the transmitter portion output; and determining whether the received signal is within a predetermined limit.

FIG. 1 illustrates, in block diagram form, an integrated circuit 10 in accordance with an embodiment. Integrated circuit 10 includes a bus 12, a processor 14, other module 15, a memory 16, and a radio frequency (RF) transceiver 18. Each of processor 14, module 15, memory 16, and transceiver 18 is bi-directionally coupled to bus 12. Bus 12 can be any type of bus for communicating any type of information such as data, address, or instructions. Integrated circuit 10 has been simplified for ease of illustration. For example, there may be multiple processors like processor 14 or different from processor 14. In one embodiment, processor 14 may be any type of microprocessor (MPU), microcontroller (MCU), or digital signal processor (DSP). Memory 16 may be shared between the multiple processors. Memory 16 may be any type of volatile or non-volatile memory, such as static random access memory (SRAM), dynamic random access memory (DRAM), flash, etc. Other module 15 may include circuits to provide specific functionally, such as for example, additional memories, a direct memory access (DMA) controller, a debug module, arbitration circuits, power management circuits, communication circuits, etc. Transceiver 18 can be for communicating any one or more communication protocols. For example, in one embodiment, transceiver 18 may be a RF transceiver for short range communication using the IEEE 802.15.4 communication protocol. In another embodiment, transceiver 18 may be used for a different protocol, such as Bluetooth, or Bluetooth low energy. One embodiment of transceiver 18 is illustrated in more detail in FIG. 2 and discussed below.

Figure 2:
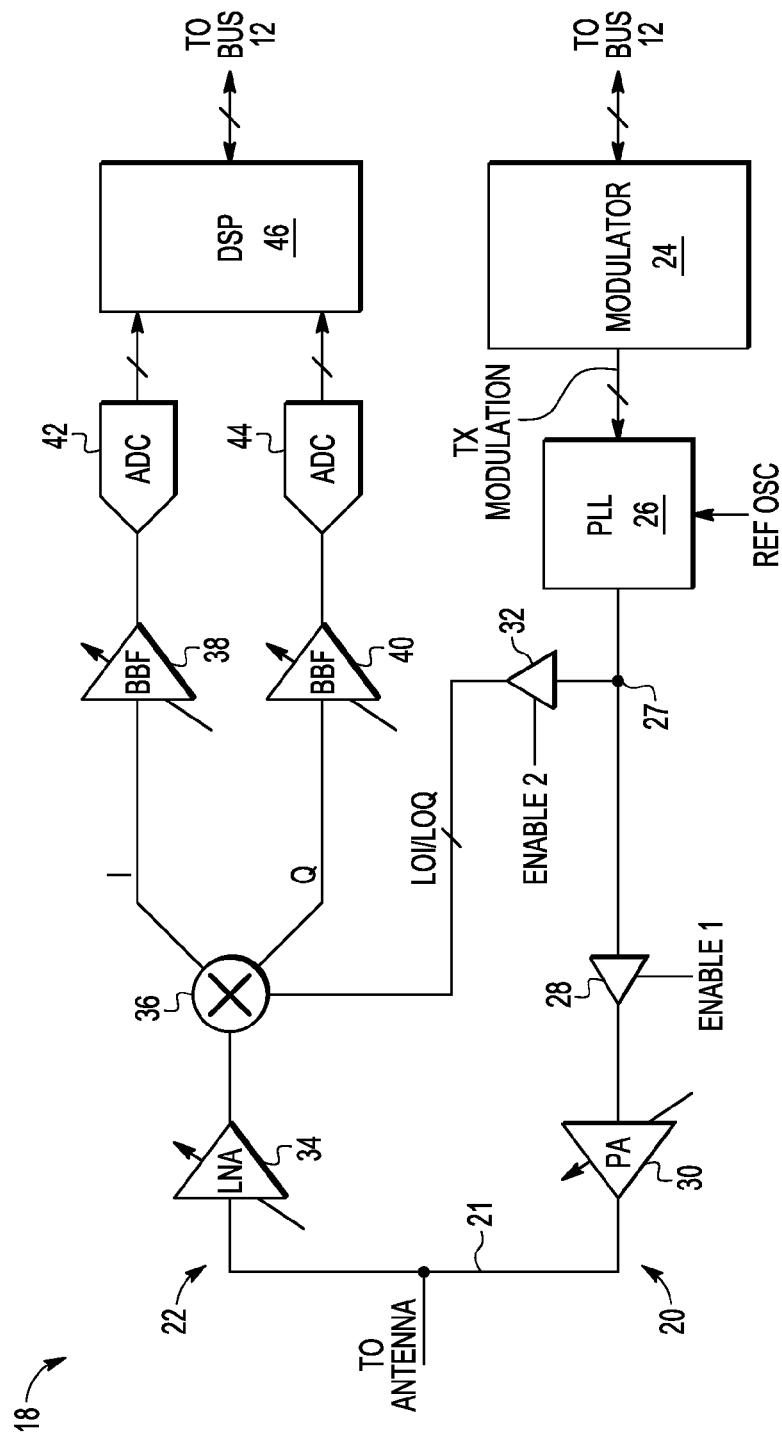
FIG. 2 illustrates, in block diagram form, transceiver 18 of FIG. 1 in accordance with an embodiment.

FIG. 2 illustrates, in block diagram form, RF transceiver 18 of FIG. 1 in accordance with an embodiment. Transceiver 18 includes a transmitter portion 20 and a receiver portion 22. Transmitter portion 20 includes modulator 24, PLL 26, buffer 28, and power amplifier (PA) 30. Receiver portion 22 includes low noise amplifier (LNA) 34, mixer 36, baseband filters 38 and 40, analog-to-digital converters (ADC) 42 and 44, and DSP 46. A buffer 32 is coupled between an internal node 27 of transmitter portion 20 and mixer 36 for providing in-phase and quadrature local oscillator signals labeled "LOI/LOQ" an input of mixer 36. An output of transmitter 20 is coupled to an input of receiver 22 at a common RF port in a loopback configuration 21.

In transmitter portion 20, modulator 24 is bi-directionally coupled to bus 12, and has an output coupled to PLL 26. An output of PLL 26 is coupled to an input of each of buffers 28 and 32 at node 27. An output of buffer 28 is coupled to an input of power amplifier 30. An output of PA 30 is coupled to an antenna (not shown). Power amplifier 30 has a control input for adjusting a gain of PA 30. In one embodiment, both the transmitter portion 20 and the receiver portion 22 are coupled to the antenna via a common RF port (not shown). A loopback configuration 21 at the output of the transmitter and the input of the receiver is used, for example, during testing of integrated circuit 10. During a test mode, transmitter 20 and receiver 22 are simultaneously operable. The antenna may be implemented as part of integrated circuit 10 or as a separate element coupled to integrated circuit 10.

In receiver portion 22, LNA 34 has an input for being coupled to the antenna, and an output coupled to an input of mixer 36. Mixer 36 has outputs for providing in-phase and quadrature signals labeled "I" and "Q", respectively, to inputs of the baseband filters 38 and 40. In the illustrated embodiment, receiver 22 is characterized as being a direct conversion receiver. Low noise amplifier 34 and baseband filters 38 and 40 have control inputs for gain adjustment. Buffers 28 and 32 each have a control input for receiving enable signals "ENABLE 1" and "ENABLE 2", respectively. Digital signal processor 46 receives converted in-phase and quadrature signals from ADCs 42 and 44. Digital signal processor 46 provides decimation and other processing of the received signals and outputs processed in-phase and quadrature signals to bus 12.

Transceiver 18 is a constant envelope RF transceiver that is phase or frequency modulated instead of being amplitude modulated like a linear transceiver. Phase locked loop 26 is shared between transmitter 20 and receiver 22. That is, during normal operation PLL 26 is used by transmitter 20 during a transmit mode of transceiver 18, and is used by receiver 22 during a receive mode of transceiver 18. The transceiver's transmit and receive activities are executed in a time division duplex fashion. When transmitting in a normal mode, control signal ENABLE 1 is asserted and control signal ENABLE 2 is negated. Buffer 28 is enabled in a transmit path and buffer 32 is disabled, preventing the output signal of PLL 26 from being provided to mixer 36 of receiver 22. When operating receiver 22 in a normal operating mode, control signal ENABLE 1 is negated, and control signal ENABLE 2 is asserted, thus causing the output signal of PLL 26 to be provided to mixer 36 and preventing the output of PLL 26 from being provided to PA 30. In the illustrated embodiment, PLL 26 functions as a conventional PLL to provide a timing signal during normal transmit and receive operations. Generally, a reference oscillator signal labeled "REF OSC" in FIG. 2 is inputted to PLL 26 and compared with an input signal in a phase detector to provide a corresponding voltage determined by the phase difference of the two input signals. The voltage from the phase detector is then used to control an output frequency of the output of the voltage controlled oscillator (VCO). The output of the VCO becomes the input signal of the phase detector in a feedback arrangement.

During a test mode for testing transceiver 18, a modulation signal labeled "TX MODULATION" from modulator 24 is mixed with a reference signal labeled REF OSC by PLL 26 to produce the PLL output signal. The modulation signal TX MODULATION is a predetermined constant envelope modulation signal. In the illustrated embodiment, modulation signal TX MODULATION comprises two substantially single frequency tones. In other embodiments, the modulation signal TX MODULATION may be a single tone, two or more tones, or any other modulation.

Mathematically the mixing of a constant envelope modulated TX signal, with an Rx carrier that carries the same modulation, in the absence of any Tx and Rx imperfections and non-linearity, results in a received down converted signal that comprises a baseband signal with the transmitted constant envelope modulation that has been scaled in bandwidth by a factor of two. A simple analysis below shows the derivation of the same.

Let a PLL be locked to a carrier frequency of $f_c$ and performing a constant envelope modulation $\theta(t)$. Then the modulated PLL output, assuming a unit amplitude is given by $$LO = \cos(\omega_c t + \theta(t))$$

where $\omega_c = 2\pi f_c$ and LO stands for the local oscillator signal. For transmit output, the LO signal will be scaled by the power amplifier (PA), i.e., $$TX_{out} = A \cdot \cos(\omega_c t + \theta(t))$$

where A is the gain of the transmit PA. Under loopback conditions, the transmit signal is fed to the receiver input, where it is down converted by mixing it with receiver LO signal. In this setup, the receiver LO is the same as the LO signal described above. For mathematical simplicity, we can assume the receive LO to be unit amplitude as well. The receive down conversion process can then be expressed as $$RX_{mix} = TX_{out} \cdot LO$$

$$RX_{mix} = A \cos(\omega_c t + \theta(t)) \cdot \cos(\omega_c t + \theta(t)) = A \cos^2(\omega_c t + \theta(t))$$

$$RX_{mix} = A[\cos^2(\omega_c t) \cdot \cos^2(\theta(t)) - 2\cos(\omega_c t)\sin(\omega_c t)\cos(\theta(t))\sin(\theta(t)) + \sin^2(\omega_c t) \cdot \sin^2(\theta(t))]$$

Simplification of the above formula uses a set of trigonometric identities and half angle formula.

$$\cos^2(\omega_c t) \cdot \cos^2(\theta(t)) = \frac{1}{2}(1 + \cos(2\omega_c t)) \cdot \frac{1}{2}(1 + \cos(2\theta(t))) =$$
$$\frac{1}{4}(1 + \cos(2\omega_c t) + \cos(2\theta(t)) + \cos(2\omega_c t) \cdot \cos(2\theta(t)))$$

similarly $$\sin^2(\omega_c t) \cdot \sin^2(\theta(t)) = \frac{1}{4}(1 - \cos(2\omega_c t) - \cos(2\theta(t)) + \cos(2\omega_c t) \cdot \cos(2\theta(t)))$$

$$\cos(\omega_c t)\sin(\omega_c t)\cos(\theta(t))\sin(\theta(t)) = \frac{1}{4}\sin(2\omega_c t) \cdot \sin(2\theta(t))$$

Using the formulas above in the equation for $RX_{mix}$ and simplifying $$RX_{mix} = \frac{A}{4}[2 + 2\cos(2\omega_c t) \cdot \cos(2\theta(t)) - 2\sin(2\omega_c t) \cdot \sin(2\theta(t))]$$

$$RX_{mix} = \frac{A}{2}[1 + (2\cos^2(\omega_c t) - 1) \cdot \cos(2\theta(t)) - \sin(2\omega_c t) \cdot \sin(2\theta(t))]$$

$$= \frac{A}{2}[1 - \cos(2\theta(t)) + 2\cos^2(\omega_c t) \cdot \cos(2\theta(t)) + \sin(2\omega_c t) \cdot \sin(2\theta(t))]$$

In the simplified expression above, the first term is a DC term, the second term is a baseband signal with twice the constant envelope modulation bandwidth of the transmit modulation. The third and the fourth terms represent signal components at the RF frequency and its multiples, which are rejected by the BBF 38 and 40.

Both of buffers 28 and 32 are enabled so that receiver 22 can operate concurrently with transmitter 20. The modulated transmit signal from transmitter 20, as modulated using TX MODULATION, is then provided to receiver portion 22 via loopback configuration 21. Receiver portion 22 provides the received signal to mixer 36 which combines the received signal with local oscillator signal LOI/LOQ from shared PLL 26. The mixing function of mixer 36 is illustrated in more detail in FIG. 4. The mixed received signal from the output of mixer 36 is centered around DC. Variable gain baseband filters 38 and 40 filters the received signal, and then an analog-to-digital conversion is performed on the received signal before providing the resulting digital filtered received baseband signal to DSP 46 for further processing. The processed I and Q receiver output signals have a frequency that is twice the frequency of the corresponding signal output from the transmitter portion The digital filtered received signal as processed by receiver portion 22, is then provided to memory 16 and analyzed. In one analysis, a comparison of a computed distortion level with a predetermined threshold (as a function of the ideal, or known, TX MODULATION) is used to decide if the part under test is functionally acceptable. One test may comprise computing an error metric such as an error vector magnitude (EVM) of the stored digital received signal. The described loopback testing approach can be carried out for a set of transmitter and receiver setup conditions including gains, signal level, modulation types, etc. The loopback testing can provide test coverage other than mere functionality testing such as compression, receiver bandwidth, systematic distortions, etc. The analysis can be performed either on-chip with processor 14 or off-chip using a tester or analyzer. In one embodiment, processor 14 provides test results for integrated circuit 10. In another embodiment, an external tester may be used. Note that the same loopback path 21 can be used in another embodiment for on-chip calibration/trim of the transceiver circuits, comprising, for example, calibration or trimming of receiver analog baseband filter corners and/or IQ gain/phase mismatch correction. Also, in another embodiment, another circuit module of integrated circuit 10 is tested concurrently with the testing of transceiver 18.

Figure 3:
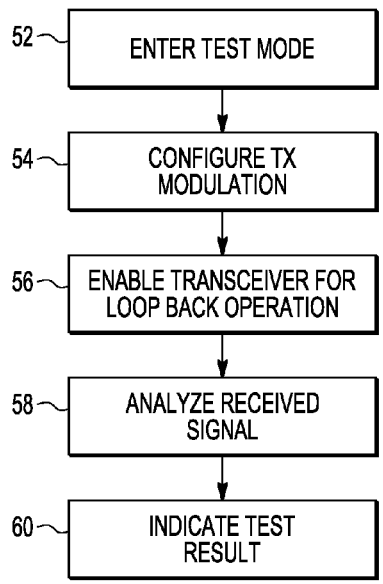
FIG. 3 illustrates a flowchart of a method for testing an integrated circuit in accordance with an embodiment.
Figure 4:
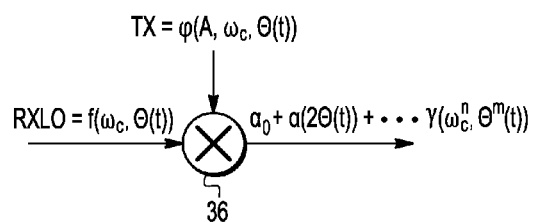
FIG. 4 illustrates a mixer 36 of transceiver 18 of FIG. 2 for implementing method step 54 of FIG. 3.

FIG. 3 illustrates a flowchart of a method 50 for testing integrated circuit 10 in accordance with an embodiment. Test mode is entered at step 52. At step 54, the transmitter modulation signal TX MODULATION is configured. In the illustrated embodiment, the TX MODULATION signal includes two single frequency tones as illustrated in FIG. 4 and described below. At step 56, transceiver 18 is configured for loopback operation. To enable for loopback operation, both of control signals ENABLE 1 and ENABLE 2 are asserted to provide a signal path for transmitter modulation signal TX MODULATION. In one embodiment, transmitter 20 and receiver 22 may operate simultaneously. In another embodiment, transmitter 20 and receiver 22 may operate in a time division duplex fashion. The TX MODULATION signal is then provided by transmitter 20 and received and processed by receiver 22 via the loopback path 21 as described above in the discussion of FIG. 2. At step 58, the received signal is analyzed. The received signal can be analyzed for errors on-chip by circuitry embedded on integrated circuit 10, or the received signal can be analyzed off-chip by external circuitry. In one embodiment, the analyzer may be a spectrum analyzer. In another embodiment, the analyzer may be an on-chip processor capable of computing an error vector magnitude (EVM) of the stored portion of the digitized baseband signal. In yet another embodiment, the analyzer may be an on-chip processor that performs a comparison of the received signal and the reference signal in the frequency domain using an FFT operation. At step 60, the test results are indicated. In one embodiment, the test results are used to determine if integrated circuit 10 functions according to predetermined criteria.

FIG. 4 illustrates mixer 36 of receiver portion 22 of FIG. 2 for implementing method step 58 of FIG. 3, which corresponds to down converting the transmit modulated output using the receive LO (i.e., LOI/LOQ). In FIG. 4 the transmit modulated signal TX MODULATION is illustrated as a function TX=$\phi(A, \omega_c, \theta(t))$ where $\phi(.)$ is a non-linear function that represents the non-linearity in the TX MODULATION, A represents the gain in the transmit PA, $\omega_c$, is the RF carrier frequency in radians and $\theta(t)$ is the constant envelope TX MODULATION. The receiver down conversion takes place by a mathematical multiplication with the receiver local oscillator, RXLO=$f(\omega_c, \theta(t))$, which has the same carrier frequency and modulation as the TRANSMIT MODULATION. The receive LO typically has a voltage swing of rail-to-rail, which is considered unity in this mathematical representation. The mixer 36 multiplies these two signals in time domain, which produces a complex signal at the mixer output containing signal components at DC, i.e., $\alpha_0$, a scaled 2× baseband modulation signal component $\alpha(2\theta(t))$ and a number of other signal components for different exponent values of the carrier frequency and modulation given by $\gamma(\omega_c^n, \theta^m(t))$, where n and m are greater than or equal to 1.

Figure 5:
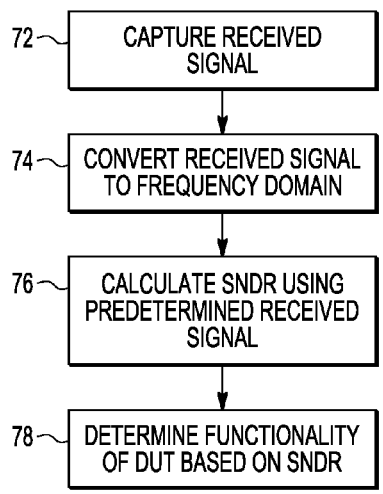
FIG. 5 illustrates a flowchart of method step 58 of FIG. 3 in more detail in accordance with one embodiment.
Figure 6:
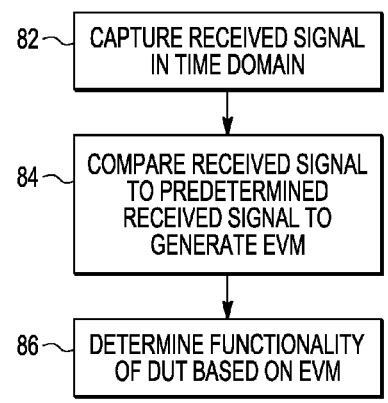
FIG. 6 illustrates a flowchart of method step 58 of FIG. 3 in more detail in accordance with another embodiment.

FIG. 5 illustrates a flowchart of method step 58 of FIG. 3 in more detail in accordance with one embodiment. FIG. 5 illustrates a method implemented in the frequency domain and FIG. 6 illustrates a method implemented in the time domain. At step 72 in FIG. 5, the received signal via loopback path 21 is captured in the time domain. In one embodiment, the received signal may be captured in a memory, such as for example, memory 16 illustrated in FIG. 1. At step 74, the received signal is converted to the frequency domain. At step 76, the signal-to-noise-distortion ratio (SNDR) is calculated using the actual received signal and a predetermined received signal. At step 78, the functionality of the device under test (DUT) is determined based on the calculated SNDR.

FIG. 6 illustrates a flowchart of method step 58 of FIG. 3 in more detail in accordance with another embodiment. At step 82, the received signal is captured in the time domain. In one embodiment, the received signal may be captured in a memory, such as for example, memory 16 illustrated in FIG. 1. At step 84, the received signal is compared to a predetermined received signal to generate an EVM. At step 86, predetermined functionality of the device under test (DUT) is determined based on the generated EVM.

Figure 7:
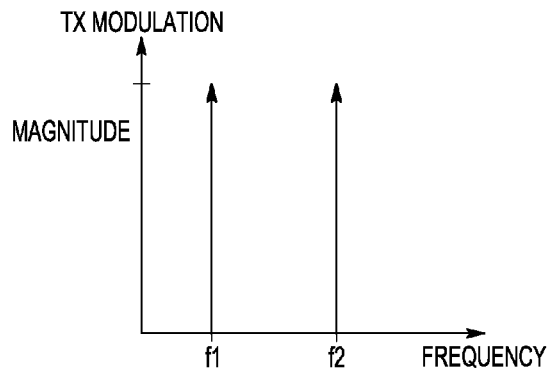
FIGS. 7-10 illustrate waveforms in the frequency domain of various signals in transceiver 18.

FIGS. 7-10 illustrate waveforms in the frequency domain of various signals in transceiver 18. FIG. 7 illustrates a waveform of transmitter modulation signal TX MODULATION having two tones, where one tone is at a frequency f1 and a second tone is at a frequency f2.

Figure 8:
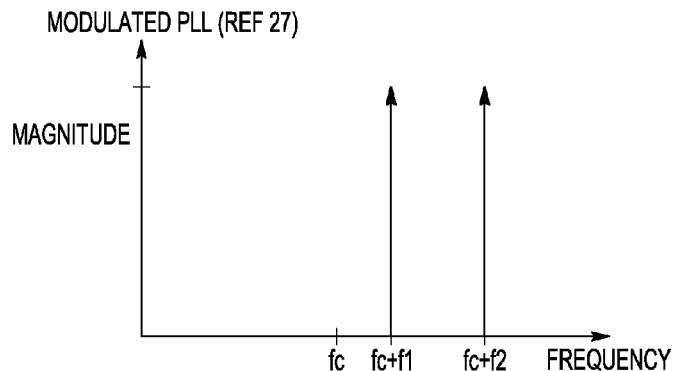

FIG. 8 illustrates a waveform of the modulated PLL signal at internal node 27 of the transceiver 18 of FIG. 2. As illustrated in FIG. 8, the two tones are added to a carrier frequency fc. The modulated PLL signal is then used by both the receiver and the transmitter during testing.

Figure 9:
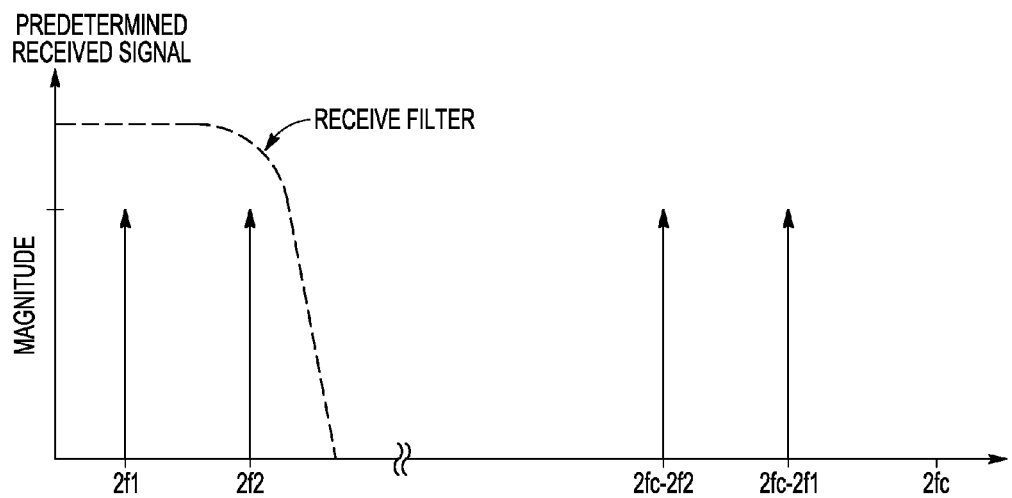

FIG. 9 illustrates a predetermined ideal received signal in receiver 22. The predetermined received signal is illustrated after being processed by DSP 46. As can be seen in FIG. 9, the predetermined ideal received signal has two components 2f1 and 2f2 that are filtered by the baseband filters 38 and 40 as indicated by the dashed curve labeled "RECEIVE FILTER". And the other components are located at 2× the frequency of the filtered received signal, labeled "2fc-2f2" and "2fc-2f1".

Figure 10:
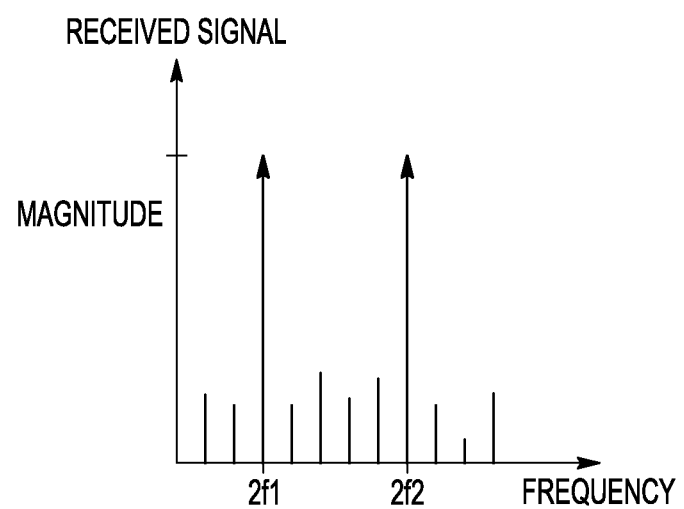

FIG. 10 illustrates a received signal of receiver 22 in the presence of transmit, receive, or loopback distortions.

The test method and circuits as described herein provide low cost testing of a transceiver having a shared PLL. Also, testing of a processor or other circuit module can be accomplished in parallel with testing of the transceiver, thus reducing test time.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. An integrated circuit comprising:
   a receiver portion comprising:
      a first receiver input to receive a radio frequency (RF) signal;
      a second receiver input to receive an output signal from a phase locked loop; and
      a mixer coupled to the first receiver input and to the second receiver input;
   a transmitter portion to transmit an RF signal at a transmitter output of the transmitter portion and to receive a modulated PLL signal at a transmitter input of the transmitter portion;
   the phase locked loop (PLL) shared between the receiver portion and the transmitter portion, the PLL during normal operation being used by the transmitter portion during a transmit mode and being used by the receiver portion during a receive mode, and the PLL providing at an output the modulated PLL signal based on a transmitter modulation signal; and
   wherein, during a test mode, the transmitter output and the first receiver input are coupled together in a loopback configuration, and the modulated PLL signal is provided to both the first receiver input and to the second receiver input.

2. The integrated circuit of claim 1, further comprising a common RF port whereby the transmitter output and the first receiver input are coupled in the loopback configuration during the test mode.

3. The integrated circuit of claim 1, wherein the transmitter portion and the receiver portion are simultaneously operable.

4. The integrated circuit of claim 1, wherein the PLL is configured to provide a predetermined constant envelope modulation to the transmitter portion and to the second receiver input of receiver portion.

5. The integrated circuit of claim 1, further comprising a memory for storing at least a portion of a digitized baseband signal representative of the RF signal received at the first receiver input.

6. The integrated circuit of claim 5, further comprising an analyzer coupled to the memory via a bus for determining whether the at least the stored portion of the digitized baseband signal is within a predetermined limit.

7. The integrated circuit of claim 6, wherein the analyzer is a spectrum analyzer.

8. The integrated circuit of claim 6, wherein the analyzer is a processor capable of computing an error metric of the at least the stored portion of the digitized baseband signal.

9. A method of testing an integrated circuit comprising:
coupling a receiver portion of a radio frequency (RF) transceiver at a first receiver input to a transmitter portion of the transceiver at a transmitter output in a loopback configuration during a test mode;
providing a phase locked loop (PLL) output signal to the transmitter portion and to a second receiver input of the receiver portion, the PLL output signal during normal operation being used by the transmitter portion during a transmit mode and being used by the receiver portion during a receive mode;
generating the PLL output signal based on a transmitter modulation signal received at the PLL during the test mode;
receiving at the first receiver input a signal output from the transmitter portion;
receiving at the second receiver input the PLL output signal;
performing a mixing function, in the receiver portion, the function having inputs including a signal received at the first receiver input receiver input and a signal received at the second receiver input; and
determining a test result based on an output of the mixing function.

10. The method of claim 9, wherein the transmitter portion and the receiver portion are operated concurrently during the test mode.

11. The method of claim 9, wherein generating the PLL output signal provides a predetermined constant envelope modulation signal to the transmitter portion and to the second receiver input of the receiver portion.

12. The method of claim 11, wherein the predetermined constant envelope modulation is characterized as a tone modulation.

13. The method of claim 9, further comprising outputting an in-phase receiver signal at a first output of the receiver portion and a quadrature receiver signal at a second output of the receiver portion wherein each of the in-phase receiver signal and the quadrature receiver signal has a frequency that is twice the frequency of a corresponding signal output from the transmitter portion.

14. The method of claim 13, further comprising coupling a signal processor to the first output and to the second output of the receiver portion for generating a digital baseband signal representative of the RF signal received at the first receiver input.

15. The method of claim 14, further comprising storing in a memory at least a portion of the digitized baseband signal representative of the RF signal received at the first receiver input.

16. The method of claim 15, further comprising analyzing the at least a portion of the digitized baseband signal representative of the RF signal stored in the memory for distortions introduced in loopback configuration.

17. The method of claim 16, wherein the analyzing the at least a portion of the digitized baseband signal representative of the RF signal stored in the memory includes computing an error metric of the at least a portion of the digitized baseband signal representative of the RF signal stored in the memory.

18. The method of claim 9, further comprising testing a circuit module concurrently while testing the transceiver.

19. A method of testing a radio frequency (RF) transceiver comprising:
during a test mode:
providing a RF transceiver having a first receiver portion input coupled to a transmitter portion output in a loopback configuration;
performing a loopback test during which a phase locked loop (PLL) output is coupled to a second receiver portion input and to the transmitter portion, the PLL providing at the output a modulated PLL signal based on a transmitter modulation signal; and
mixing a signal received at the first receiver input portion with a signal received at the second receiver portion input;
during normal operation:
coupling the PLL output to the transmitter portion during a transmit mode; and
coupling the PLL output to the receiver portion during a receive mode.

20. The method of claim 19, wherein during a test mode further comprises:
receiving at the first receiver portion input a signal from the transmitter portion output; and
determining whether the received signal is within a predetermined limit.

* * * * *